(12) United States Patent
Lee et al.

(10) Patent No.: US 9,017,881 B2
(45) Date of Patent: Apr. 28, 2015

(54) ELECTROLYTE COMPRISING AMIDE COMPOUND AND ELECTROCHEMICAL DEVICE CONTAINING THE SAME

(75) Inventors: Byoung-Bae Lee, Chungcheongnam-do (KR); Jae-Seung Oh, Seoul (KR); Ji-Won Park, Daejeon (KR); Hyo-Jin Lee, Daejeon (KR); Dong-Su Kim, Daejeon (KR); Yeon-Suk Hong, Daejeon (KR)

(73) Assignee: LG Chem, Ltd. (KR)

( * ) Notice: Subject to any disclaimer, the term of this patent is extended or adjusted under 35 U.S.C. 154(b) by 669 days.

(21) Appl. No.: 13/224,603

(22) Filed: Sep. 2, 2011

(65) Prior Publication Data

US 2011/0318647 A1 Dec. 29, 2011

Related U.S. Application Data

(63) Continuation-in-part of application No. PCT/KR2010/001368, filed on Mar. 4, 2010.

(30) Foreign Application Priority Data

| Mar. 4, 2009 | (KR) | 10-2009-0018583 |
| Mar. 4, 2009 | (KR) | 10-2009-0018584 |
| Jul. 14, 2009 | (KR) | 10-2009-0064105 |
| Jul. 20, 2009 | (KR) | 10-2009-0065977 |
| Mar. 4, 2010 | (KR) | 10-2010-0019514 |

(51) Int. Cl.
*H01M 10/056* (2010.01)
*H01M 10/00* (2006.01)
(Continued)

(52) U.S. Cl.
CPC ........... *H01M 10/0569* (2013.01); *H01G 9/035* (2013.01); *H01G 9/038* (2013.01); *H01G 11/58* (2013.01); *H01M 10/0525* (2013.01); *H01M 10/0565* (2013.01); *H01M 2300/0028* (2013.01);
(Continued)

(58) Field of Classification Search
CPC .... H01M 10/00; H01M 10/056; H01M 10/26
USPC .................................. 429/188, 199, 310–317
See application file for complete search history.

(56) References Cited

U.S. PATENT DOCUMENTS

| 2004/0218347 A1 | 11/2004 | Schwake |
| 2006/0172201 A1 | 8/2006 | Yasukawa et al. |
| 2007/0099090 A1* | 5/2007 | Oh et al. ........................ 429/339 |

FOREIGN PATENT DOCUMENTS

| EP | 0887875 A1 | 12/1998 |
| EP | 1357628 A1 | 10/2003 |

(Continued)

OTHER PUBLICATIONS

International Search Report, PCT/KR2010/001368, dated Sep. 30, 2010.

*Primary Examiner* — Karie O'Neill Apicella
(74) *Attorney, Agent, or Firm* — Lerner, David, Littenberg, Krumholz & Mentlik, LLP

(57) ABSTRACT

Provided are an electrolyte comprising an amide compound of a specific structure, in which an alkoxy group is substituted with an amine group, and an ionizable lithium salt, and an electrochemical device containing the same. The electrolyte may have excellent thermal and chemical stability and a wide electrochemical window. Also, the electrolyte may have a sufficiently low viscosity and a high ionic conductivity, and thus, may be usefully applied as an electrolyte of electrochemical devices using various anode materials.

15 Claims, 6 Drawing Sheets

(51) Int. Cl.
*H01M 10/26* (2006.01)
*H01M 10/0569* (2010.01)
*H01G 9/035* (2006.01)
*H01G 9/022* (2006.01)
*H01G 11/58* (2013.01)
*H01M 10/0525* (2010.01)
*H01M 10/0565* (2010.01)
*H01M 10/0567* (2010.01)
*H01M 10/42* (2006.01)

(52) U.S. Cl.
CPC .. *H01M 2300/0082* (2013.01); *H01M 10/0567* (2013.01); *H01M 10/4235* (2013.01); *Y02E 60/122* (2013.01); *Y02E 60/13* (2013.01)

(56) References Cited

FOREIGN PATENT DOCUMENTS

| | | | | |
|---|---|---|---|---|
| JP | 1173989 | 3/1999 | | |
| JP | 2000-348760 A | 12/2000 | | |
| JP | 2000348759 A | 12/2000 | | |
| JP | 2000348760 A * | 12/2000 | ............ | H01M 10/40 |
| JP | 2003-187866 A | 7/2003 | | |
| JP | 2010516040 A | 5/2010 | | |
| KR | 2009-0076313 A | 7/2009 | | |
| WO | 2008088167 A1 | 7/2008 | | |
| WO | 2009/091159 A2 | 7/2009 | | |

* cited by examiner

ELECTROLYTE COMPRISING AMIDE COMPOUND AND ELECTROCHEMICAL DEVICE CONTAINING THE SAME

CROSS-REFERENCE TO RELATED APPLICATION(S)

This application is a CIP application of International Application No. PCT/KR2010/001368, which claims the benefit under 35 U.S.C. 119(a) of Korean Patent Application No. 10-2009-0018583, filed on Mar. 4, 2009, Korean Patent Application No. 10-2009-0018584, filed on Mar. 4, 2009, Korean Patent Application No. 10-2009-0064105, filed on Jul. 14, 2009, Korean Patent Application No. 10-2009-0065977, filed on Jul. 20, 2009, and Korean Patent Application No. 10-2010-0019514, filed on Mar. 4, 2010, in the Korean Intellectual Property Office, the entire disclosure which is incorporated herein by reference for all purposes.

TECHNICAL FIELD

The present invention relates to an electrolyte comprising an amide compound and an electrochemical device containing the same.

BACKGROUND ART

Various types of electrolytes are being used for contemporary electrochemical devices, for example, lithium secondary batteries, electrolytic condensers, electric double-layer capacitors and electrochromic display devices, and for dye-sensitized solar cells of which various studies are being undertaken for future commercialization, and the importance of electrolytes is increasing day by day.

In particular, lithium secondary batteries have high energy density and long life cycle, and thus are at the center of attention. Generally, a lithium secondary battery comprises an anode made from carbon materials or lithium metal alloys, a cathode made from lithium metal oxides, and an electrolyte made by dissolving a lithium salt in an organic solvent. The structural stability and capacity of lithium metal oxides are determined by intercalation and disintercalation reactions of lithium ions. As the charge potential rises, lithium metal oxides increase in capacity but become structurally unstable. This unstable structure of an electrode provokes the generation of oxygen, which may cause overheating in a battery or a reaction with an electrolyte, possibly resulting in the battery exploding.

Currently, organic solvents used widely for an electrolyte of lithium secondary batteries include ethylene carbonate, propylene carbonate, dimethoxy ethane, gamma-butyrolactone (GBL), N,N-dimethyl formamide, tetrahydrofurane, acetonitrile, and the like. Because these organic solvents generally have high volatility and high ignitability, lithium secondary batteries using the same may have problems in stability, especially at high temperature.

In order to solve this problem, suggestions have been made to use imidazolium-based or ammonium-based ionic liquids as an electrolyte of lithium secondary batteries. However, the ionic liquids may be reduced in an anode at a higher voltage than lithium ions, or imidazolium or ammonium cations may be inserted into an anode together with lithium ions, which may rather deteriorate the performance of the battery.

Meanwhile, Korean Patent Registration No. 10-751203 and Korean Laid-open Patent Publication No. 10-2007-85575 disclose, as an electrolyte, a eutectic mixture of a lithium salt and an amide compound such as acetamide, urea, methylurea, caprolactam, valerolactam, trifluoroacetamide, carbamate, formamide, and the like, which is represented by a certain chemical formula. The eutectic mixture exhibits high thermal and chemical stability as well as a relatively wide electrochemical window, and thus, solves the problems such as evaporation or ignition of an electrolyte caused by the use of conventional organic solvents.

As described above, the development of various electrolytes is fast growing. In particular, there is an increasing demand for an electrolyte containing a compound having higher stability at high temperature and a low minimum limit of an electrochemical window, suitable for applications to an electrochemical device of which various electrochemical characteristics are required.

DISCLOSURE

Technical Problem

Therefore, it is an object of the present invention to provide an electrolyte having high thermal and chemical stability, and an electrochemical device containing the same.

Another object of the present invention is to provide an electrolyte having lower resistivity in a device, and an electrochemical device containing the same.

Still another object of the present invention is to provide an electrolyte having higher stability at high temperature, a sufficiently low viscosity, a high ionic conductivity and a wide electrochemical window, and an electrochemical device containing the same.

Technical Solution

To achieve the objects, an electrolyte of the present invention comprises an amide compound represented by the following chemical formula 1 in which an alkoxy group is substituted with an amine group, and an ionizable lithium salt:

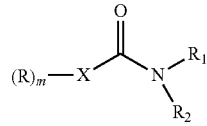

[Chemical Formula 1]

where R is hydrogen, halogen or any one selected from the group consisting of an alkyl group, an alkylamine group, an alkenyl group, an aryl group and an allyl group, which is unsubstituted or substituted with halogen and has 1 to 20 carbons, $R_1$ and $R_2$ is hydrogen, halogen or any one selected from the group consisting of an alkyl group, an alkylamine group, an alkenyl group and an aryl group, which is unsubstituted or substituted with halogen and has 1 to 20 carbons, independently, wherein at least one of $R_1$ and $R_2$ is an alkoxy group represented by $-\mathrm{O(CH_2)pCH_3}$, or wherein at least one of $R_1$ and $R_2$ is an alkoxy group represented by $-\mathrm{O(CH_2)pCH_3}$ and the other is $-\mathrm{(CH_2)}_n-$ and connects N with X to form a ring, p is an integer of 0 to 8, and n is an integer of 1 to 10, and X is any one selected from the group consisting of oxygen, sulfur, nitrogen, phosphorus and silicon, wherein i) m is 1 when X is oxygen or sulfur, ii) m is 2 when X is nitrogen or phosphorus, iii) m is 3 when X is silicon, and iv) in the case that X is connected to N to form a ring, m is 0 when X is oxygen or sulfur, m is 1 when X is nitrogen or phosphorus, and m is 2 when X is silicon.

In the electrolyte of the present invention, the amide compound in which an alkoxy group is substituted with an amine group may include N-methoxy methylcarbamate, N-methoxy ethylcarbamate, N-methoxy-N-methyl methylcarbamate, N-methoxy-N-methyl ethylcarbamate, N-methoxy-N-methyl propylcarbamate, N-methoxy-N-methyl butylcarbamate, N-methyl-N-methoxyethyl methoxyethyl carbamate, N-methoxy-N-methyl-2,2,2-trifluoroethyl carbamate, N-methoxy-N-methyl-2-fluoroethyl carbamate, N-methoxy-N-methyl-pentafluoropropyl carbamate, N-methoxy-N-methyl-2-(perfluorohexyl)ethyl carbamate, N-methoxy-N-methyl-6-(perfluorobutyl)hexyl carbamate, N-methoxy oxazolidinone, and the like.

In the electrolyte of the present invention, an anion of the lithium salt may include $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, and the like.

In the electrolyte of the present invention, a mole ratio of the amide compound in which an alkoxy group is substituted with an amine group, and the lithium salt may be preferably 1:1 to 8:1.

In the electrolyte of the present invention, the electrolyte may preferably have an electrochemical window of 0.4 to 5.0 V.

Optionally, the electrolyte of the present invention may further comprise a carbonate-based compound, and the carbonate-based compound is not particularly limited if it is carbonate used typically as an organic solvent of an electrolyte.

Also, the electrolyte of the present invention may be a liquid electrolyte, or a solid or gel polymer electrolyte using a polymer. A polymer electrolyte may be a gel polymer electrolyte obtained by polymerization of the amide compound, the lithium salt and a precursor solution containing a monomer capable of forming a polymer by the polymerization reaction, or a polymer electrolyte obtained by impregnating the electrolyte of the present invention into a polymer.

The electrolyte of the present invention may be usefully applied to electrochemical devices such as lithium secondary batteries.

BEST MODE

Figure 1:
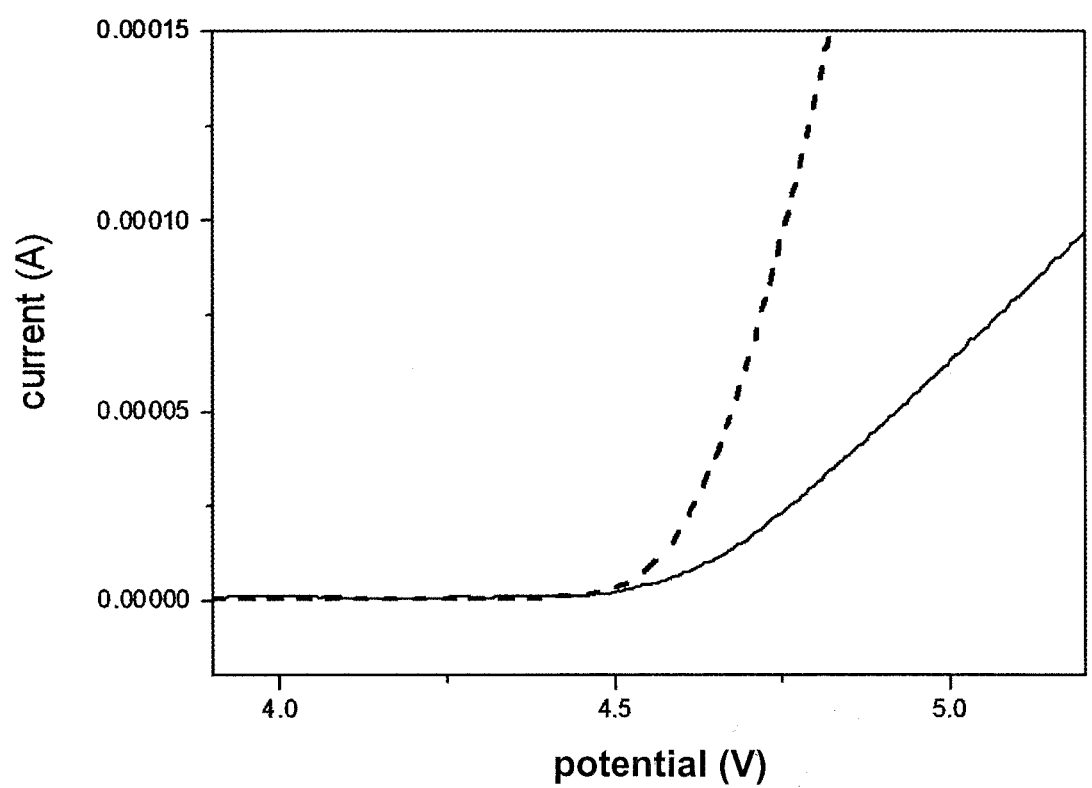
FIG. 1 is a graph measuring the electrochemical window of Example 1 (dotted line) and Example 5 (solid line).

Hereinafter, preferred embodiments of the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

An electrolyte of the present invention comprises an amide compound represented by the following chemical formula 1 in which an alkoxy group is substituted with an amine group, and an ionizable lithium salt.

[Chemical Formula 1]

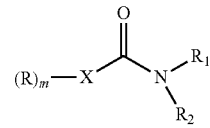

where R is hydrogen, halogen or any one selected from the group consisting of an alkyl group, an alkylamine group, an alkenyl group, an aryl group and an allyl group, which is unsubstituted or substituted with halogen and has 1 to 20 carbons, $R_1$ and $R_2$ is hydrogen, halogen or any one selected from the group consisting of an alkyl group, an alkylamine group, an alkenyl group and an aryl group, which is unsubstituted or substituted with halogen and has 1 to 20 carbons, independently, wherein at least one of $R_1$ and $R_2$ is an alkoxy group represented by —$O(CH_2)pCH_3$, or wherein at least one of $R_1$ and $R_2$ is an alkoxy group represented by —$O(CH_2)pCH_3$ and the other is —$(CH_2)_n$— and connects N with X to form a ring, p is an integer of 0 to 8, and n is an integer of 1 to 10, and X is any one selected from the group consisting of oxygen, sulfur, nitrogen, phosphorus and silicon, wherein i) m is 1 when X is oxygen or sulfur, ii) m is 2 when X is nitrogen or phosphorus, iii) m is 3 when X is silicon, and iv) in the case that X is connected to N to form a ring, m is 0 when X is oxygen or sulfur, m is 1 when X is nitrogen or phosphorus, and m is 2 when X is silicon.

Electrochemical devices may generate much heat in use or may be frequently exposed to high temperature, so stability at high temperature is a very important factor.

The inventors have prepared an electrolyte by using an amide compound of the above structure in which an alkoxy group is substituted with an amine group, and a lithium salt. The electrolyte exhibits high thermal and chemical stability unlike a conventional non-aqueous electrolyte comprising an organic solvent. Preferably, the amide compound and the lithium salt forms a eutectic mixture, which exhibits excellent thermal and chemical stability as its intrinsic characteristic. Also, the electrolyte comprising the amide compound, in which an alkoxy group is substituted with an amine group, and the lithium salt according to the present invention has lower viscosity and higher stability at high temperature than a conventional eutectic mixture of an amide-based compound such as acetamide or methyl carbamate, and a lithium salt.

Further, when R is substituted with halogen in the chemical formula 1, improvement in oxidation stability may raise a maximum limit of an electrochemical window (also referred to as a potential window) and lower a minimum limit, thereby resulting in a wider electrochemical window. For example, an electrolyte comprising an alkoxyalkyl group-containing amide compound and an ionizable lithium salt may have an electrochemical window of 0.4 to 5.0 V, however the present invention is not limited in this regard.

As a result, the electrolyte comprising an amide compound in which an alkoxy group is substituted with an amine group and a lithium salt may contribute to improvement of high temperature stability of secondary batteries, and may be usefully applied as an electrolyte of secondary batteries using various anode materials.

In the electrolyte of the present invention, the amide compound in which an alkoxy group is substituted with an amine group may include N-methoxy methylcarbamate, N-methoxy ethylcarbamate, N-methoxy-N-methyl methylcarbamate, N-methoxy-N-methyl ethylcarbamate, N-methoxy-N-methyl propylcarbamate, N-methoxy-N-methyl butylcarbamate, N-methyl-N-methoxyethyl methoxyethyl carbamate, N-methoxy-N-methyl-2,2,2-trifluoroethyl carbamate, N-methoxy-N-methyl-2-fluoroethyl carbamate, N-methoxy-N-methyl-pentafluoropropyl carbamate, N-methoxy-N-methyl-2-(perfluorohexyl)ethyl carbamate, N-methoxy-N-methyl-6-(perfluorobutyl)hexyl carbamate, N-methoxy oxazolidinone, and the like.

In the electrolyte of the present invention, the lithium salt is an ionizable lithium salt and may be expressed by $Li^+X^-$. An anode of the lithium salt may include $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, and the like, however the present invention is not limited in this regard.

Optionally, the electrolyte of the present invention may further comprise a carbonate-based compound.

Generally, ionic conductivity is determined based on the degree of mobility of ions moving in an electrolyte solution, and thus, viscosity of the electrolyte solution and ion concentration in the electrolyte solution are factors affecting the ionic conductivity. The lower the viscosity of the electrolyte solution, the more freely the ions move in the electrolyte solution and the ionic conductivity increases. The higher the ion concentration in the electrolyte solution, the amount of ions serving as charge carriers increases and consequently the ionic conductivity increases.

A preferred viscosity of the electrolyte according to the present invention is not particularly limited, however 50 cP or lower is most suitable for applications to secondary batteries. When the electrolyte of the present invention further comprises a carbonate-based compound, the electrolyte may further reduce in viscosity and consequently improve in ionic conductivity. In this context, the electrolyte of the present invention may more preferably have a viscosity of 4 to 30 cP in consideration of ionic conductivity and thermal stability of the electrolyte. In the same viewpoint, a preferred ionic conductivity of the electrolyte may be 1.0 to 10 mS/cm.

To achieve the above viscosity and ionic conductivity, the content of the carbonate-based compound may be preferably 5 to 200 parts by weight per the total 100 parts by weight of the amide compound and the lithium salt.

The carbonate-based compound included in the electrolyte of the present invention is not particularly limited if it is a carbonate-based compound used typically to a non-aqueous electrolyte of secondary batteries, for example a linear carbonate-based compound, a cyclic carbonate-based compound, or mixtures thereof. Specifically, the carbonate-based compound may include, for example, propylene carbonate (PC), ethylene carbonate (EC), diethyl carbonate (DEC), dimethyl carbonate (DMC), dipropyl carbonate (DPC), butylene carbonate, methylpropyl carbonate, ethylpropyl carbonate, dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (GBL), and the like, however the present invention is not limited in this regard. As already well known, where carbonate-based compounds may be substituted with halogen atoms.

The electrolyte of the present invention may be prepared in a typical way well known in the art. For example, the electrolyte may be made by mixing an amide compound, in which an alkoxy group is substituted with an amine group, with a lithium salt at room temperature, and applying a proper temperature of 70° C. or lower to effect a reaction, followed by purification. In this instance, a mole ratio of the amide compound in which an alkoxy group is substituted with an amine group and the lithium salt in the electrolyte may be preferably 1:1 to 8:1, more preferably 2:1 to 6:1. Within this range, ionic conductivity suitable for an electrolyte may be ensured. When carbonate is further included, after the amide compound and the lithium salt are mixed at room temperature, a carbonate-based compound may be added thereto, or after the amide compound, the lithium salt and carbonate are simultaneously mixed at room temperature, a proper temperature of 70° C. or lower may be applied thereto.

It is obvious to an ordinary person skilled in the art that the electrolyte of the present invention may further comprise various kinds of additives or organic solvents, without departing from the scope of the invention.

The electrolyte of the present invention is not limited to a specific type of electrolyte and may use all types of electrolytes. For example, the electrolyte of the present invention may be a liquid electrolyte, or a solid or gel polymer electrolyte using a polymer.

When the electrolyte of the present invention is a polymer electrolyte, the electrolyte may be a gel polymer electrolyte obtained by polymerization of the electrolyte and a precursor solution containing a monomer capable of forming a polymer by the polymerization reaction, or a polymer electrolyte obtained by impregnating the electrolyte into a solid or gel polymer.

First, a gel polymer electrolyte prepared by a polymerization reaction of a precursor solution is described.

According to an aspect of the present invention, a gel polymer electrolyte may be made by polymerizing (i) the electrolyte comprising the amide compound and the lithium salt; and (ii) a precursor solution containing a monomer capable of forming a polymer by the polymerization reaction. Optionally, (i) the electrolyte may further comprise carbonate.

In the polymerization reaction, all kinds of monomers may be applied that can form a gel polymer with the electrolyte. For example, a vinyl monomer may be used, however the present invention is not limited in this regard. Advantageously, vinyl monomer may achieve a very simple polymerization when it is mixed with the electrolyte to form a gel polymer.

Available vinyl monomers may include, for example, acrylonitrile, methylmethacrylate, methylacrylate, methacrylonitrile, methylstyrene, vinylesters, vinyl chloride, vinylidene chloride, acrylamide, tetrafluoroethylene, vinylacetate, methylvinylketone, ethylene, styrene, para-methoxystyrene and para-cyanostyrene, or mixtures thereof, however the present invention is not limited in this regard.

The precursor solution may additionally contain a typical polymerization initiator or photo initiator. The initiator may be decomposed by heat or UV rays to form radicals, and reacts with the monomer, which is referred to as a free radical polymerization, to form a gel polymer electrolyte. And, the initiator may not be used in polymerization with the monomer. Generally, free radical polymerization may go through an initiation step where temporary molecules of strong reactivity or an active site is formed, a propagation step where a monomer is added to an end of a chain in the active site to form a new active site at the end of the chain, a transfer step where the active site is transferred to the other molecules, and a chain termination step where the active center is destroyed.

Available thermal polymerization initiators may include, for example, organic peroxides or hydroperoxides such as benzoyl peroxide, acetyl peroxide, dilauryl peroxide, di-tert-butyl peroxide, cumyl hydroperoxide and hydrogen peroxide; azo compounds such as 2,2-azobis(2-cyanobutane), 2,2-azobis(methylbutyronitrile), AIBN (azobis(iso-butyronitrile) and AMVN (azobisdimethyl-valeronitrile); organic metals such as alkylated silvers; and the like, however the present invention is not limited in this regard. Also, the photo initiator that forms radicals by light such as UV rays may include, for example, chloroacetophenone, diethoxy acetophenone (DEAP), 1-phenyl-2-hydroxy-2-methyl propaneone (HMPP), 1-hydroxy cyclohexyl phenyl ketone, α-amino acetophenone, benzoin ether, benzyl dimethyl ketal, benzophenone, thioxanthone, 2-ethylanthraquinone (2-ETAQ), and the like, however the present invention is not limited in this regard.

In addition to the above components, the precursor solution of the gel polymer electrolyte according to the present invention may selectively contain additives well known in the art.

The gel polymer electrolyte may be made using the precursor solution in a typical way well known in the art. In this instance, the gel polymer electrolyte may be preferably made by an in-situ polymerization reaction in an electrochemical device. The in-situ polymerization reaction may be conducted using heat or UV irradiation. A weight ratio of (i) the electrolyte and (ii) the monomer in the precursor solution may be preferably controlled to 0.5~0.95:0.05~0.5. The degree of polymerization of the gel polymer may be adjusted depending on reaction factors such as polymerization time, polymerization temperature and an amount of irradiated light, and thus, the degree of polymerization may be controlled so that an electrolyte does not leak and the volume of a polymer does not shrink due to over-polymerization.

According to another aspect of the present invention, a polymer electrolyte may be made by injecting (i) the electrolyte into a previously prepared solid or gel polymer such that the electrolyte is impregnated in the polymer.

Available polymers may include, for example, polymethylmethacrylate, polyvinylidene difluoride, polyvinyl chloride, polyethylene oxide, polyhydroxyethylmethacrylate or mixtures thereof, however the present invention is not limited in this regard. This process may be simpler than the above-mentioned process using in-situ polymerization.

According to still another aspect of the present invention, a polymer electrolyte may be made by dissolving (i) the electrolyte and a polymer in a solvent and eliminating the solvent. In this instance, the electrolyte may be impregnated in a polymer matrix.

Available solvents are not specially limited, but may include, for example, toluene, acetone, acetonitrile, THF, and the like. Also, the solvent may be eliminated in various traditional ways including heating, without special limitations.

The electrolyte of the present invention may be applied to typical electrochemical devices well known in the art that require various electrochemical characteristics according to the purpose of use.

The electrochemical devices may include primary batteries, secondary batteries, fuel cells, solar cells, electrochromic display devices, electrolytic condensers or capacitors, and the like. Specifically, the electrochemical devices may include, for example, lithium secondary batteries, electric double-layer capacitors, dye-sensitized solar cells, electrochromic display devices, and the like, however the present invention is not limited in this regard.

A lithium secondary battery using the electrolyte of the present invention may have good thermal stability. Accordingly, after a pouch-type lithium secondary battery using the electrolyte of the present invention was charged to 4.2V and left alone at 90° C. for 4 hours, the battery may have a thickness variability of 10% or less.

BEST MODE FOR INVENTION

Hereinafter, various preferred examples of the present invention will be described in detail for better understanding. However, the examples of the present invention may be modified in various ways, and they should not be interpreted as limiting the scope of the invention. The examples of the present invention are provided so that persons having ordinary skill in the art can better understand the invention.

1. Preparation of Electrolyte

Example 1-(1)

Synthesis of N-methoxy-N-methyl ethylcarbamate

After 5 g of N-methoxy-N-methyl amine salt was dissolved in water, pH was adjusted to an alkaline level using $NaHCO_3$ aqueous solution at low temperature and 5.6 g of ethyl chloroformate was slowly added thereto on a drop-by-drop basis. Thereafter, when a reaction was completed, extraction with ethyl acetate and distillation were made to obtain N-methoxy-N-methyl ethylcarbamate.

Example 1-(2)

Preparation of Electrolyte 5.8 g of the obtained N-methoxy-N-methyl ethylcarbamate and 2 g of $LiPF_6$ were put into a round bottom flask and slowly stirred for 2 hours under a nitrogen atmosphere, thereby yielding 7.8 g of a desired electrolyte.

Example 2-(1)

Synthesis of N-methoxy-N-methyl methylcarbamate

After 5 g of N-methoxy-N-methyl amine salt was dissolved in water, pH was adjusted to an alkaline level using $NaHCO_3$ aqueous solution at low temperature and 4.8 g of methyl chloroformate was slowly added thereto on a drop-by-drop basis. Thereafter, when a reaction was completed, extraction with ethyl acetate and distillation were made to obtain N-methoxy-N-methyl methylcarbamate.

Example 2-(2)

Preparation of Electrolyte 5.2 g of the obtained N-methoxy-N-methyl methylcarbamate and 2 g of $LiPF_6$ were put into a round bottom flask and slowly stirred for 2 hours under a nitrogen atmosphere, thereby yielding 7.2 g of a desired electrolyte.

Example 3

Preparation of Electrolyte

After 4.1 g of N-methoxy-N-methyl ethylcarbamate and 2 g of LiPF$_6$ were put into a round bottom flask and slowly stirred for 2 hours under a nitrogen atmosphere, 1.7 g of ethyl methylcarbonate was added thereto, thereby yielding 7.8 g of a desired electrolyte.

Example 4

Preparation of Electrolyte

After 3.6 g of N-methoxy-N-methyl methylcarbamate and 2 g of LiPF$_6$ were put into a round bottom flask and slowly stirred for 2 hours under a nitrogen atmosphere, 1.6 g of ethyl methylcarbonate was added thereto, thereby yielding 7.2 g of a desired electrolyte.

Example 5-(1)

Synthesis of N-methoxy-N-methyl-2,2,2-trifluoroethyl carbamate

After 1.44 g of methoxymethyl amine salt and 1.75 g of triphosgene were mixed in methylene chloride solution and cooled down to 0° C., 3.13 g of triethyl amine was slowly added thereto on a drop-by-drop basis. Thereafter, the temperature was increased to room temperature and stirred for 1 hour. After a reaction was completed, filtration was made to eliminate methylene chloride. Next, after tetrahydrofuran solution was added thereto and a resultant salt was filtered off, distillation under vacuum was made to obtain 2 g of N-methoxy-N-methyl chloroformate.

Next, 0.78 g of sodium hydride was put into tetrahydrofuran solution and 1.7 g of 2,2,2-trifluoroethanol solution was slowly added thereto on a drop-by-drop basis at low temperature. Thereafter, after being stirred for 2 hours, 2 g of the obtained chloroformate solution was slowly added thereto on a drop-by-drop basis at low temperature. After a reaction was completed, a small amount of water was added thereto. Next, the tetrahydrofuran solution was distilled, and extraction was made using methylene chloride and water. After extraction was completed, vacuum distillation under reduced pressure was made to obtain N-methoxy-N-methyl-2,2,2-trifluoroethyl carbamate.

Example 5-(2)

Preparation of Electrolyte 5.8 g of the obtained N-methoxy-N-methyl-2,2,2-trifluoroethyl carbamate and 2 g of LiPF$_6$ were put into a round bottom flask and slowly stirred for 2 hours under a nitrogen atmosphere, thereby yielding 7.8 g of a desired electrolyte.

Example 6-(1)

Synthesis of N-methoxy-N-methyl-2-fluoroethyl carbamate 0.35 g of sodium hydride was put into tetrahydrofuran solution, and 0.5 g of 2-fluoroethanol solution was slowly added thereto on a drop-by-drop basis at low temperature. Thereafter, after being stirred for 2 hours, 0.9 g of the chloroformate solution obtained in Example 1-(1) was slowly added thereto on a drop-by-drop basis at low temperature. After a reaction was completed, a small amount of water was added thereto. Next, the tetrahydrofuran solution was distilled, and extraction was made using methylene chloride and water. After extraction was completed, vacuum distillation under reduced pressure was made to obtain N-methoxy-N-methyl-2-fluoroethyl carbamate.

Example 6-(2)

Preparation of Electrolyte 5.2 g of the obtained N-methoxy-N-methyl-2-fluoroethyl carbamate and 2 g of LiPF$_6$ were put into a round bottom flask and slowly stirred for 2 hours under a nitrogen atmosphere, thereby yielding 7.2 g of a desired electrolyte.

Example 7

After 4.5 g of N-methoxy-N-methyl-2,2,2-trifluoroethyl carbamate and 2 g of LiPF$_6$ were put into a round bottom flask and slowly stirred for 2 hours under a nitrogen atmosphere, 1.7 g of ethyl methylcarbonate was added thereto, thereby yielding about 8.1 g of a desired electrolyte.

Example 8

After 3.4 g of N-methoxy-N-methyl-2-fluoroethyl carbamate and 2 g of LiPF$_6$ were put into a round bottom flask and slowly stirred for 2 hours under a nitrogen atmosphere, 1.6 g of ethyl methylcarbonate was added thereto, thereby yielding about 6.8 g of a desired electrolyte.

Comparative Example 1

Synthesis of methylcarbamate-LiTFSI Eutectic Mixture 4.7 g of purified methylcarbamate and 6 g of LiTFSI were put into a round bottom flask and slowly stirred for 2 hours at room temperature under a nitrogen atmosphere, thereby yielding 10.7 g of a eutectic mixture.

Comparative Example 2

Synthesis of EMITFSI Ionic Liquid 8.3 g of purified imidazolium chloride and 16.4 g of LiTFSI were put into a round bottom flask, and extracted by slowly being stirring for 12 hours at room temperature under a nitrogen atmosphere. The result was washed with distilled water three times, and water was removed in a vacuum oven for 3 days, thereby yielding 20 g of EMITFSI ionic liquid.

Comparative Example 3

Synthesis of N,N-dimethylcarbamate-LiPF$_6$ Eutectic Mixture 3.7 g of purified N,N-dimethyl methylcarbamate and 2 g of LiPF$_6$ were put into a round bottom flask and slowly stirred for 2 hours at room temperature under a nitrogen atmosphere, thereby yielding 5.7 g of a eutectic mixture.

Experimental Example 1

Evaluation of Properties of Electrolyte

The electrolytes prepared according to the above examples and comparative examples were tested for their properties evaluation as described below.

Evaluation of Viscosity, Conductivity and Electrochemical Window

The electrolytes prepared according to Examples 1 to 8, and the eutectic mixtures according to Comparative Examples 1 and 3, and the ionic liquid according to Comparative Example 2 were used as test samples. In this instance, the used electrolytes and eutectic mixtures each had a molecular ratio of an amide compound and a lithium salt of 3:1. Viscosity was measured at 25° C. using a RS150 viscometer, and conductivity was measured using Inolab 740. The test results are shown in the following Table 1.

Also, the electrochemical windows of the electrolytes according to Examples 1 and 5 are shown in FIG. 1. In FIG. 1, a dotted line indicates Example 1 and a solid line indicates Example 5.

TABLE 1

| | Viscosity (cP) | Conductivity (mS/cm) | Electrochemical window (V) |
|---|---|---|---|
| Example 1 | 7.32 | 4.05 | 0.7~4.5 |
| Example 2 | 7.03 | 4.12 | 0.65~4.5 |
| Example 3 | 5.6 | 7.1 | 0.7~4.5 |
| Example 4 | 6.0 | 5.1 | 0.65~4.5 |
| Example 5 | 20 | 1.1 | 0.45~4.75 |
| Example 6 | 15 | 1.4 | 0.4~4.68 |
| Example 7 | 12 | 3.79 | 0.45~4.75 |
| Example 8 | 10.5 | 4.3 | 0.4~4.68 |
| Comparative Example 1 | 62 | 1.7 | 0.6~4.7 |
| Comparative Example 2 | 34 | 2.38 | 1.1~5.6 |
| Comparative Example 3 | 51 | 1.15 | 0.4~4.45 |

Referring to Table 1, it was found that the electrolyte of the present invention had improvement in viscosity and ionic conductivity when compared with the conventional eutectic mixture and ionic liquid. Also, it was found that Examples 5 to 8 having a halogen substitute showed an expanded electrochemical window with an increase in maximum limit when compared with Examples 1 to 4 and a decrease in minimum limit when compared with Comparative Examples 1 and 2.

2. Manufacture of Secondary Battery

Example 9

Formation of Cathode $LiCoO_2$ as a cathode active material, artificial graphite as a conductive material, and polyvinylidene fluoride as a binder were mixed at a weight ratio of 94:3:3, and N-methylpyrrolidone was added to the obtained mixture to prepare a slurry. The prepared slurry was coated on an aluminum foil and dried at 130° C. for 2 hours, thereby making a cathode.

(Formation of Anode)

Natural graphite as an anode active material, styrene-butadiene rubber as a binder, and carboxylmethyl cellulose as a thickening agent were mixed at a weight ratio of 94:3:3, and dispersed in water to prepare a slurry. The prepared slurry was coated on a copper foil, followed by drying and rolling, thereby making an anode.

(Assembly of Secondary Battery)

Figure 2:
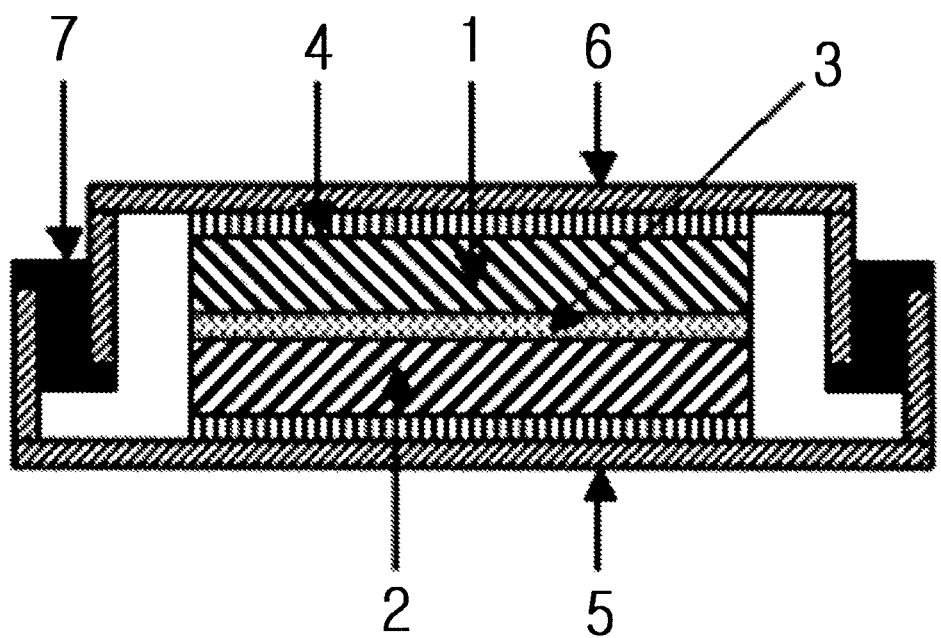
FIG. 2 is schematic cross-sectional view of a coin-type secondary battery.

The cathode and the anode were prepared at a size of 1 cm², and a separator was interposed between them. The electrolyte prepared according to Example 1 was injected thereto, thereby manufacturing a secondary battery as shown in FIG. 2. In FIG. 2, the reference numeral 1 designates a cathode, the reference numeral 2 designates an anode, the reference numeral 3 designates a separator and an electrolyte, the reference numeral 4 designates a spacer, the reference numeral 5 designates a coin can container, the reference numeral 6 designates a coin can cover, and the reference numeral 7 designates a seaming rubber.

Example 10

A secondary battery was manufactured in the same way as Example 9 except that the electrolyte prepared in Example 3 was injected.

Example 11

A secondary battery was manufactured in the same way as Example 9 except that the electrolyte prepared in Example 5 was injected.

Example 12

A secondary battery was manufactured in the same way as Example 9 except that the electrolyte prepared in Example 7 was injected.

Comparative Example 4

A secondary battery was manufactured in the same way as Example 9 except that 1M of $LiPF_6$ solution having a volume ratio of ethylene carbonate:ethylmethylcarbonate of 1:2 was used as an electrolyte.

Experimental Example 2

Measurement of Impedance of Secondary Battery

The batteries of Examples 9, 10 and 12 and Comparative Example 4 were measured for impedance by means of a potentionstat. After the batteries were charged to 4.2V, a low voltage of 10 mV was applied at a frequency of 3 kHz to 100 mHz and the resulting current response was measured.

Figure 3:
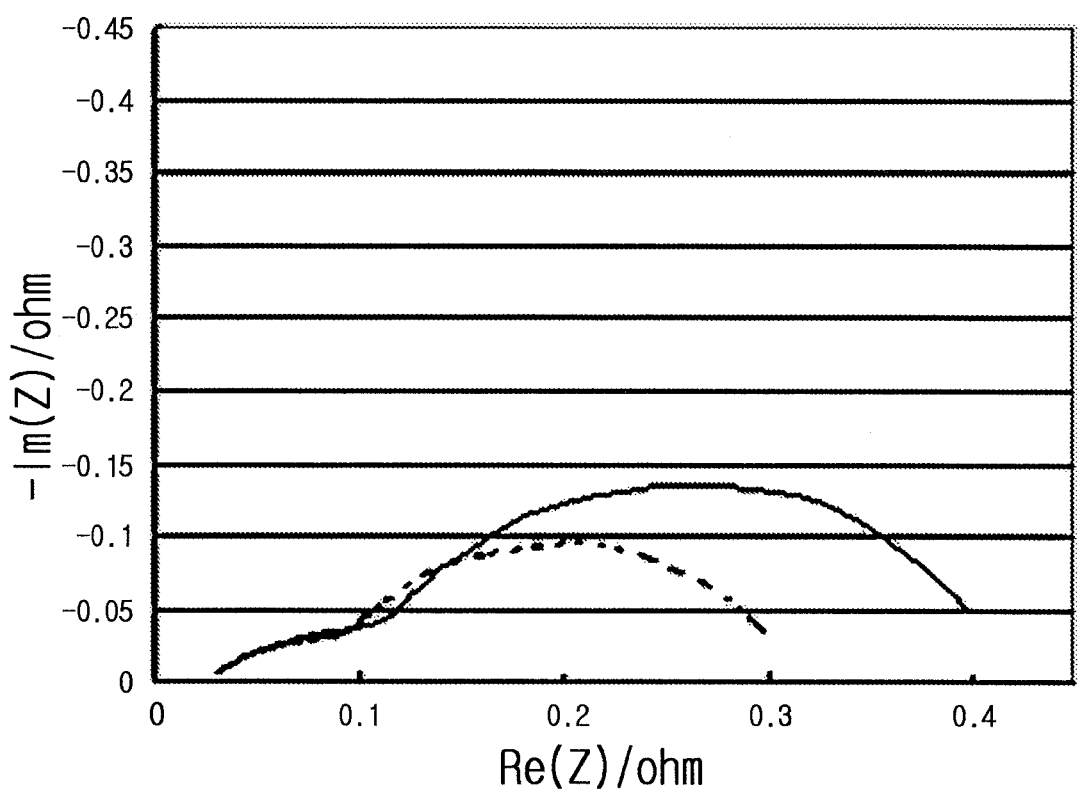
FIG. 3 is a graph showing the measured impedance of secondary batteries according to Example 9 and Comparative Example 4.
Figure 4:
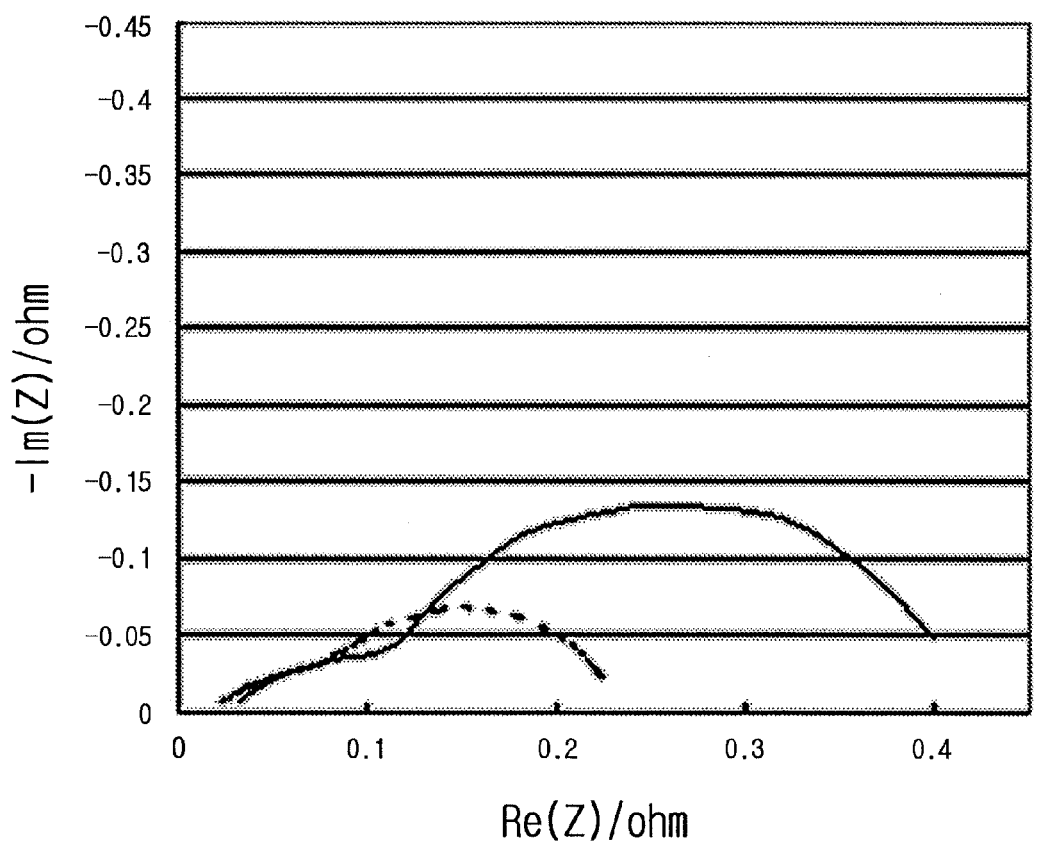
FIG. 4 is a graph showing the measured impedance of secondary batteries according to Example 10 and Comparative Example 4.
Figure 5:
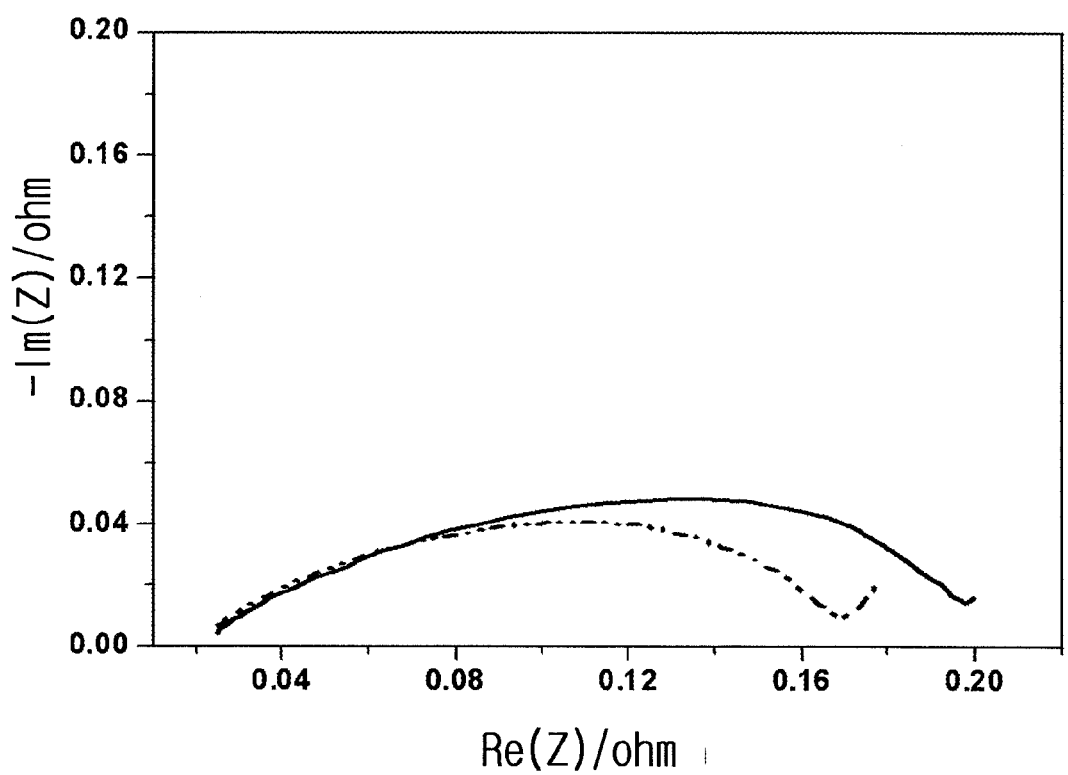
FIG. 5 is a graph showing the measured impedance of secondary batteries according to Example 12 and Comparative Example 4.

The measurement results are shown in FIGS. 3 to 5. In FIG. 3, a dotted line indicates Example 9 and a solid line indicates Comparative Example 4. In FIG. 4, a dotted line indicates Example 10 and a solid line indicates Comparative Example 4. In FIG. 5, a dotted line indicates Example 12 and a solid line indicates Comparative Example 4.

Experimental Example 3

Evaluation of Battery Performance at Room Temperature

The secondary batteries manufactured as mentioned above were each charged/discharged with 0.5 mAcm² at room temperature (25° C.), and the discharge capacity and charging/discharging efficiency according to cycles were measured. The measurement results are shown in Table 2.

TABLE 2

| | Discharge capacity | Charging/ discharging efficiency |
|---|---|---|
| Example 9 | 97 | 99 |
| Example 10 | 97 | 99 |
| Comparative Example 4 | 97 | 99 |

Referring to Table 2, it was found that the battery of Example 3 using the electrolyte of the present invention had performance similar to that of Comparative Example 3 using a conventional organic solvent.

Experimental Example 4

High Temperature Stability Test of Secondary Battery

The pouch-type secondary battery of Example 11 using 2.3 g of electrolyte prepared according to Example 5 and the pouch-type secondary battery of Comparative Example 4 as a control were each charged with 0.5 mAcm$^2$ and left alone at 90° C. for 4 hours, and thickness variability of the batteries was measured. The experimental results are shown in Table 3.

TABLE 3

| | Initial Thickness (mm) | Second Thickness (mm) | Increment (%) |
|---|---|---|---|
| Example 11 | 3.86 | 4.12 | 6.7% |
| Comparative Example 4 | 3.85 | 4.43 | 15.0% |

Referring to Table 3, it was found that the battery of Example 11 using the electrolyte of the present invention had better stability at high temperature than that of Comparative Example 4 using a conventional electrolyte.

Experimental Example 5

Evaluation of Battery Performance at High Temperature

The secondary batteries manufactured as mentioned above were each charged/discharged with 0.5 mAcm$^2$ at 45° C., and the charging/discharging efficiency according to cycles was measured.

Figure 6:
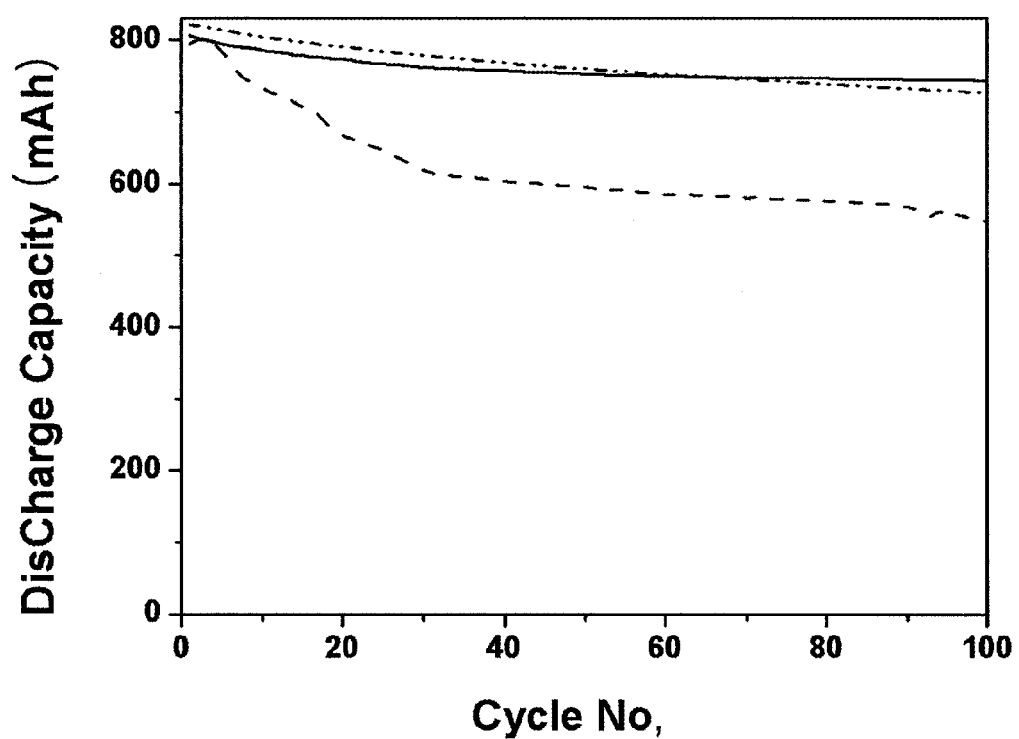
FIG. 6 is a graph showing the charging/discharging efficiency after cycling at high temperature of secondary batteries manufactured according to Example 9, Example 12, and Comparative Example 4.

The measurement results of the secondary battery of Comparative Example 4 using an electrolyte containing a conventional carbonate-based solvent and the secondary batteries of Examples 9 and 12 are shown in FIG. 6.

As shown in FIG. 6, it was found that after 100th cycle, Examples 9 and 12 had a discharge capacity of 93% or more and a charging/discharging efficiency of 97% relative to the initial capacity and Comparative Example 4 had a discharge capacity of 68%. In FIG. 6, a dotted line indicates Example 9, a solid line indicates Example 12, and a two-dot chain line indicates Comparative Example 4. Accordingly, it was found that the electrolyte comprising an amide-based compound according to the present invention could show better high temperature performance at room temperature than a conventional commercialized liquid electrolyte.

INDUSTRIAL APPLICABILITY

The electrolyte of the present invention may give the following effects.

First, the electrolyte of the present invention may have excellent thermal and chemical stability, and thus may solve the conventional problems caused by the use of an organic solvent, such as evaporation, ignition and side reaction of an electrolyte.

Second, the electrolyte of the present invention may have a low viscosity and a high electrical conductivity, and can reduce the interfacial resistivity in a device, improve the oxidation stability, and achieve a wider electrochemical window. Thus, the electrolyte may be usefully applied to an electrolyte of an electrochemical device of which various electrochemical characteristics are required.

Third, the electrolyte of the present invention may exhibit better stability at high temperature, thereby contributing to improvement in high temperature stability of electrochemical devices.

What is claimed is:
1. An electrolyte, comprising:
(a) an amide compound represented by the following chemical formula 1, in which an alkoxy group is substituted with an amine group; and
(b) an ionizable lithium salt:

[Chemical Formula 1]

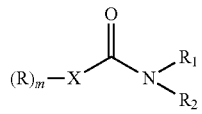

where R is hydrogen, halogen or any one selected from the group consisting of an alkyl group, an alkylamine group, an alkenyl group, an aryl group and an allyl group, which is unsubstituted or substituted with halogen and has 1 to 20 carbons,
$R_1$ and $R_2$ is hydrogen, halogen or any one selected from the group consisting of an alkyl group, an alkylamine group, an alkenyl group and an aryl group, which is unsubstituted or substituted with halogen and has 1 to 20 carbons, independently, wherein at least one of $R_1$ and $R_2$ is an alkoxy group represented by —O(CH$_2$)pCH$_3$, or wherein at least one of $R_1$ and $R_2$ is an alkoxy group represented by —O(CH$_2$)pCH$_3$ and the other is —(CH$_2$)$_n$— and connects N with X to form a ring,
p is an integer of 0 to 8, and n is an integer of 1 to 10, and
X is any one selected from the group consisting of oxygen, sulfur, nitrogen, phosphorus and silicon, wherein i) m is 1 when X is oxygen or sulfur, ii) m is 2 when X is nitrogen or phosphorus, iii) m is 3 when X is silicon, and iv) in the case that X is connected to N to form a ring, m is 0 when X is oxygen or sulfur, m is 1 when X is nitrogen or phosphorus, and m is 2 when X is silicon.
2. The electrolyte according to claim 1,
wherein the amide compound, in which an alkoxy group is substituted with an amine group, is any one selected from the group consisting of N-methoxy methylcarbamate, N-methoxy ethylcarbamate, N-methoxy-N-methyl methylcarbamate, N-methoxy-N-methyl ethylcarbamate, N-methoxy-N-methyl propylcarbamate, N-methoxy-N-methyl butylcarbamate, N-methoxy-N-methyl-2,2,2-trifluoroethyl carbamate, N-methoxy-N-methyl-2-fluoroethyl carbamate, N-methoxy-N-methyl-pentafluoropropyl carbamate, N-methoxy-N-methyl-2-(perfluorohexyl)ethyl carbamate, N-methoxy-N-methyl-6-(perfluorobutyl)hexyl carbamate, and N-methoxy oxazolidinone.

3. The electrolyte according to claim 1,
wherein an anion of the lithium salt is any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)$, $PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

4. The electrolyte according to claim 1,
wherein a molecular ratio of the amide compound in which an alkoxy group is substituted with an amine group and the lithium salt in the electrolyte is 1:1 to 8:1.

5. The electrolyte according to claim 1,
wherein the electrolyte has an electrochemical window of 0.4 to 5.0V.

6. The electrolyte according to claim 1,
wherein the electrolyte has a viscosity of 50 cP or less.

7. The electrolyte according to claim 1, further comprising:
any one carbonate-based compound selected from the group consisting of a linear carbonate-based compound, a cyclic carbonate-based compound, and mixtures thereof.

8. The electrolyte according to claim 7,
wherein the carbonate-based compound is any one selected from the group consisting of propylene carbonate, ethylene carbonate, diethyl carbonate, dimethyl carbonate, dipropyl carbonate, butylene carbonate, methylpropyl carbonate, ethylpropyl carbonate, dimethyl sulfoxide, acetonitrile, dimethoxyethane, diethoxyethane, tetrahydrofuran, N-methyl-2-pyrrolidone, ethylmethyl carbonate, gamma-butyrolactone, or mixtures thereof.

9. The electrolyte according to claim 7,
wherein the content of the carbonate-based compound is 5 to 200 parts by weight per the total 100 parts by weight of the amide compound and the lithium salt.

10. The electrolyte according to claim 7,
wherein the electrolyte has a viscosity of 4 to 30 cP.

11. The electrolyte according to claim 1,
wherein the electrolyte has an ionic conductivity of 5 to 10 mS/cm.

12. The electrolyte according to claim 1,
wherein the electrolyte is a polymer electrolyte.

13. An electrochemical device, comprising:
an electrolyte defined in claim 1.

14. The electrochemical device according to claim 13,
wherein the electrochemical device is a lithium secondary battery.

15. The electrochemical device according to claim 14,
wherein the lithium secondary battery has a thickness variability of 10% or less after the battery is charged to 4.2V and left alone at 90° C. for 4 hours.

* * * * *